April 13, 1926.
J. F. BOLLINGER
PRUNE TURNER
Filed Jan. 12, 1925
1,580,805
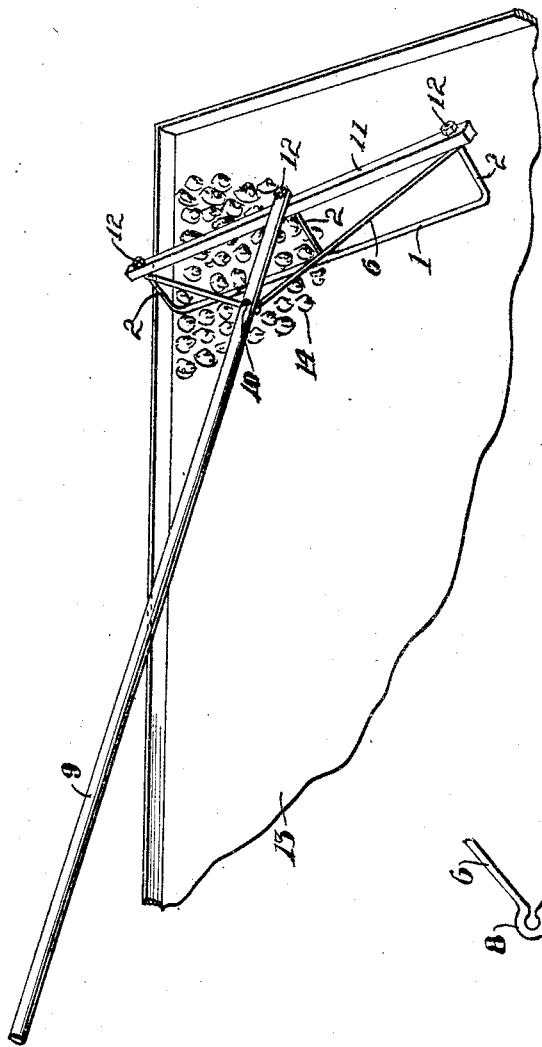
INVENTOR
Jesse F. Bollinger
BY John A. Naismith
ATTORNEY Patented Apr. 13, 1926.

1,580,805

UNITED STATES PATENT OFFICE.

JESSE F. BOLLINGER, OF MERIDIAN CORNERS, CALIFORNIA.

PRUNE TURNER.

Application filed January 12, 1925. Serial No. 1,916.

*To all whom it may concern:*

Be it known that I, JESSE F. BOLLINGER, a citizen of the United States, and a resident of Meridian Corners, in the county of Santa Clara and State of California, have invented certain new and useful Improvements in Prune Turners, of which the following is a specification.

In the sun drying of prunes, it is customary to spread the prunes in a single layer over the bottoms of large trays, these trays being very shallow and measuring about three by six feet in size. These trays are then placed in the sun and the fruit allowed to stand until the required amount of moisture has been extracted therefrom, after which they are gathered into bins preparatory to packing and shipping.

This drying process ordinarily requires several days to complete. Under unfavorable conditions, such as in cloudy weather, the period of drying is considerably lengthened and sometimes occasions considerable loss to the owner of the prunes due to the large number of trays required for drying the prunes, the labor required for stacking the trays when showers threaten, and destruction of fruit by decaying when a long but incomplete drying period is broken by rain.

It is the object of the present invention to provide a means whereby the drying prunes can be quickly and easily turned over in their trays after they have been drying for a short time, thereby greatly shortening the time required for their complete drying and consequently effecting a substantial saving to the owner by permitting the trays to be quickly emptied and used again.

In the drawing:—

Figure 1 is a perspective view of the device embodying my invention.

Figure 2 is an elevation of the device, partly in section.

Figure 3 is a detail of a portion of the brace rod.

Referring more particularly to the drawing, I show at 1 a W shaped bar formed of a cylindrical rod of substantially uniform diameter, each of the three upright legs 2—2—2 being threaded at its upper end as at 4—4—4. This element is constructed by bending the two ends of the rod 1 upwardly into parallel relation to each other and welding the central leg to the center of the rod 1 in parallel relation to the end legs.

Each of these legs 2—2—2 has a nut 5 threaded thereon as shown to provide stops for the parts mounted thereon. At 6 is shown a brace element flattened at each end as at 7 and mounted upon the ends of the two end legs 2—2 as shown its central portion being formed into an eye 8 by means of which it is bolted to a handle 9 by a bolt 10 as shown.

At 11 I show a bar mounted upon the ends of the three legs 2—2—2 and secured in position by nuts 12 threaded on to the upper ends of the several legs, the center leg also passing through the end of the handle 9 whereby to bind it securely to bar 1.

By constructing the device in this manner I provide a structure consisting of but few parts, and one that is simple in form and construction, quickly and easily assembled, strong, durable and highly efficient in its practical application.

In use the device is simply applied as shown with the bar 1 resting on the bottom of the tray 13 and at one end thereof. By drawing the device forwardly along the tray the bar 1 passes under the prunes 14 which, in falling back onto the tray at the rear of bar 1, turn over and present another surface to the rays of the sun. This turning of the prunes is accomplished without in any way disturbing the arrangement of the prunes as they are spread on the tray, the prunes merely dropping back into their original positions as the bar 1 passes from under them.

It requires but a moment's operation to turn the prunes on a single tray with this device, so it is obvious that a large number of trays may be gone over in a short time, and the trays released for a fresh lot of prunes in substantially one-half the time ordinarily required where the prunes are not turned.

It is to be understood, of course, that while I have herein shown and described but one specific embodiment of the invention, changes in form, construction and method of operation may be made within the scope of the appended claims.

I claim:—

1. A prune turner comprising a supporting bar and a handle therefor, and a cylindrical rod mounted upon said supporting bar in spaced parallel relation thereto.

2. A prune turner comprising a supporting bar and a handle therefor, and a rod mounted upon said bar in spaced parallel relation thereto and substantially unobstructed throughout its length whereby to permit the free passage of prunes thereover when drawn along a tray bottom having prunes spread thereon.

3. A prune turner comprising a rod and means for drawing the same over a flat surface having prunes spread thereon, the said rod being substantially unobstructed throughout its length whereby to permit the free passage of prunes thereover, the cross-sectional area of the rod being so proportioned to the average size of the prunes as to turn them completely over in passing thereunder.

JESSE F. BOLLINGER.